(12) United States Patent
Koborinai

(10) Patent No.: US 11,624,910 B2
(45) Date of Patent: Apr. 11, 2023

(54) HEAD UP DISPLAY DEVICE

(71) Applicant: NIPPON SEIKI CO., LTD., Niigata (JP)

(72) Inventor: Seiya Koborinai, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 9 days.

(21) Appl. No.: 15/734,517

(22) PCT Filed: Jun. 17, 2019

(86) PCT No.: PCT/JP2019/023800
§ 371 (c)(1),
(2) Date: Dec. 2, 2020

(87) PCT Pub. No.: WO2020/004093
PCT Pub. Date: Jan. 2, 2020

(65) Prior Publication Data
US 2021/0231949 A1     Jul. 29, 2021

(30) Foreign Application Priority Data
Jun. 27, 2018    (JP) .............................. JP2018-121561

(51) Int. Cl.
*G02B 27/01*     (2006.01)
*B60K 35/00*     (2006.01)

(52) U.S. Cl.
CPC .......... *G02B 27/0101* (2013.01); *B60K 35/00* (2013.01); *B60K 2370/1529* (2019.05)

(58) Field of Classification Search
CPC .... G02B 27/01–0189; G03B 21/00–64; H04N 9/31–3197
See application file for complete search history.

(56) References Cited

U.S. PATENT DOCUMENTS

| 5,243,448 A | 9/1993 | Banbury |
| 2013/0194674 A1* | 8/2013 | Horiuchi ............ G02B 27/0101 359/631 |

(Continued)

FOREIGN PATENT DOCUMENTS

| JP | 04-500869 A | 2/1992 |
| JP | 2017-056933 A | 3/2017 |

(Continued)

OTHER PUBLICATIONS

International Search Report issue in corresponding International Patent Application No. PCT/JP2019/023800, dated Aug. 13, 2019, with English translation.

*Primary Examiner* — Christopher A Lamb, II
(74) *Attorney, Agent, or Firm* — McDermott Will & Emery LLP

(57) ABSTRACT

Provided is a head up display (HUD) device in which occurrence of postcard can be reduced. The HUD device causes an image to be visually recognized as a virtual image. The HUD device is provided with: a projector 100 that emits projection light including light indicating an image; a screen 60 which the projection light reaches; and a light shielding part S that shields at least a part of the projection light excluding the light indicating the image. The screen 60 has a display possible region Rc that is a range which the projection light can reach, and a display region Ra to which the image is projected.

8 Claims, 16 Drawing Sheets

(56) References Cited

U.S. PATENT DOCUMENTS

2019/0084419 A1     3/2019   Suzuki et al.
2019/0146218 A1     5/2019   Yamazoe et al.

FOREIGN PATENT DOCUMENTS

| | | |
|---|---|---|
| JP | 2017-116884 A | 6/2017 |
| JP | 2017-116888 A | 6/2017 |
| WO | 2017/195741 A1 | 11/2017 |

\* cited by examiner

SECOND POSITIONAL CONDITION

HEAD UP DISPLAY DEVICE

CROSS REFERENCE TO RELATED APPLICATIONS

This application is the U.S. National Phase under 35 U.S.C. § 371 of International Application No. PCT/JP2019/023800, filed on Jun. 27, 2019, which claims the benefit of Japanese Application No. 2018-121561, filed on Jun. 27, 2018, the entire contents of each are hereby incorporated by reference.

TECHNICAL FIELD

The present invention relates to a head up display device.

BACKGROUND ART

A head up display (HUD) device that emits display light representing an image, which is projected from a projector onto a screen, toward a light transmitting member (for example, the front glass of a vehicle) so as to cause the image to be visually recognized as a virtual image through the light transmitting member is disclosed, for example, in Patent Document 1.

PRIOR ART DOCUMENT

Patent Document

Patent Document 1: Japanese Unexamined Patent Application Publication No. 2017-116888

SUMMARY OF THE INVENTION

Problems to be Solved by the Invention

Due to its characteristics, there is a high possibility that the projection-system HUD device disclosed in Patent Document 1 has a lower contrast of displayed images, compared to, for example, an HUD device having a system that generates display light with a TFT (Thin-Film-Transistor) liquid crystal. In a case where the outer edge part of the display area of the virtual image glows faintly due to low contrast, a phenomenon (what is termed as postcard) in which the boundary between the display area and the outside thereof stands out when being visually recognized occurs. If the postcard noticeably occurs, there is a possibility that a preferable display appearance cannot be maintained.

The present invention has been made in view of the above-described circumstance, and the purpose thereof is to provide a head up display device capable of reducing the occurrence of the postcard.

Solution to Problem

To achieve the above-described purpose, the head up display device according to the present invention is a head up display device that emits display light representing an image toward a light transmitting member in order to cause the image to be visually recognized as a virtual image, the head up display device including: a projector configured to emit projection light including light indicating the image; a screen which the projection light reaches and on which the image is projected, so that the screen emits the display light; and a light shielding part that is positioned on a light path of the projection light between the projector and the screen and configured to block at least a part of the projection light excluding the light indicating the image, wherein the screen includes a display possible area, which is a range where the projection light is able to reach and is defined by an exit pupil of the projector, and a display area, which is an area inside the display possible area and on which the image is projected, and wherein, when seen in a direction perpendicular to a main ray of the projection light, if a line along a ray traveling from one radial end of the exit pupil toward a predetermined end of the display possible area is a first outside line and a line along a ray traveling from the one radial end of the exit pupil toward an end of the display area on the predetermined end side relative to the main ray is a second outside line, the light shielding part is positioned on the first outside line and outside the second outside line.

Effect of the Invention

According to the present invention, the occurrence of postcard can be reduced.

MODE FOR CARRYING OUT THE INVENTION

An explanation is given of an embodiment of the present invention with reference to the drawings.

Figure 1:
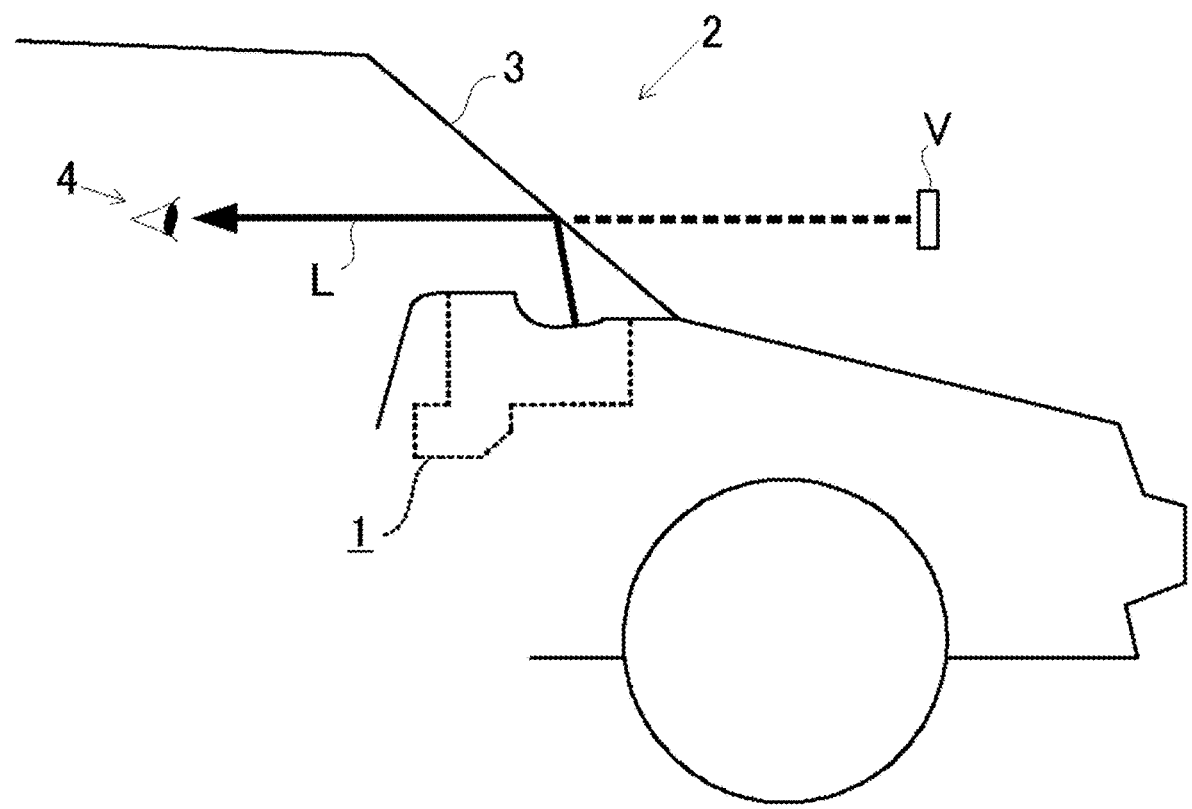
FIG. 1 is a diagram for explaining a display situation of a head up display (HUD) device according to an embodiment of the present invention.
Figure 2:
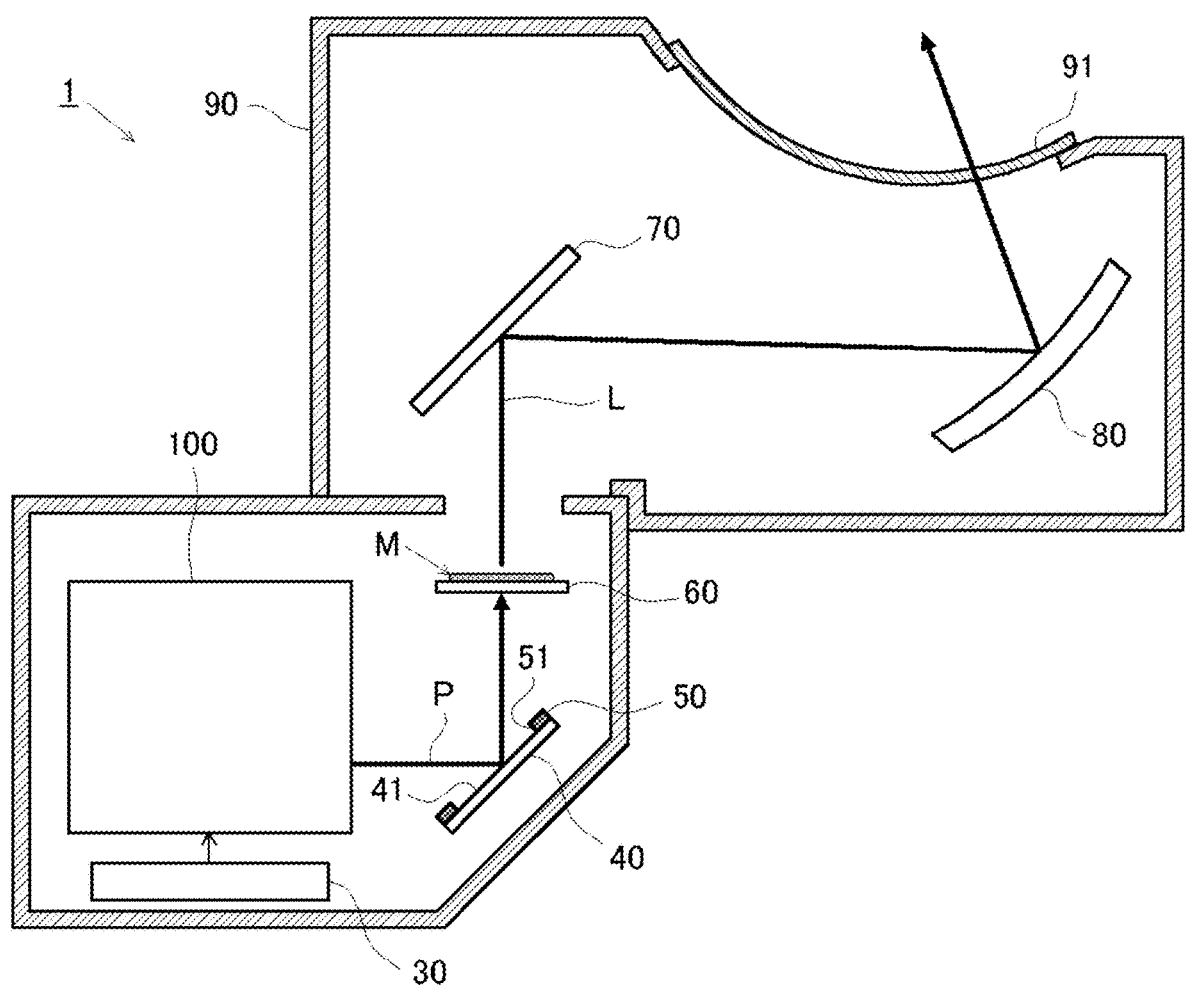
FIG. 2 is an overall configuration diagram of the HUD device.

As illustrated in FIG. 1, the head up display (HUD) device 1 according to the present embodiment is arranged on the dashboard of the vehicle 2, and the display light L representing the image M, which is schematically illustrated in FIG. 2, is emitted toward the windshield 3 (front glass). The display light L reflected by the windshield 3 is visually recognized by the observer 4 (mainly the driver of the vehicle 2) as a virtual image V of the image M in front of the windshield 3. In this way, the HUD device 1 superimposes and displays the image M, which is visually recognized as the virtual image V, on the scenery in front of the vehicle 2. The image M is an image for a notification of vehicle information related to the vehicle 2, such as a vehicle speed, an engine rotational speed, and navigation information, for example. Note that the vehicle information includes, not only information of the vehicle 2 itself, but also information outside the vehicle 2.

The HUD device 1 is for displaying the image M by a projection system, and, as illustrated in FIG. 2, the HUD device 1 includes a projector 100, a control unit 30, a first reflection part 40, a frame body 50, a screen 60, a second reflection part 70, a concave mirror 80, and a housing 90.

The projector 100 is controlled by the control unit 30, so as to generate projection light P in a field sequential method, for example, and emit the generated projection light P toward the first reflection part 40.

Figure 3A:
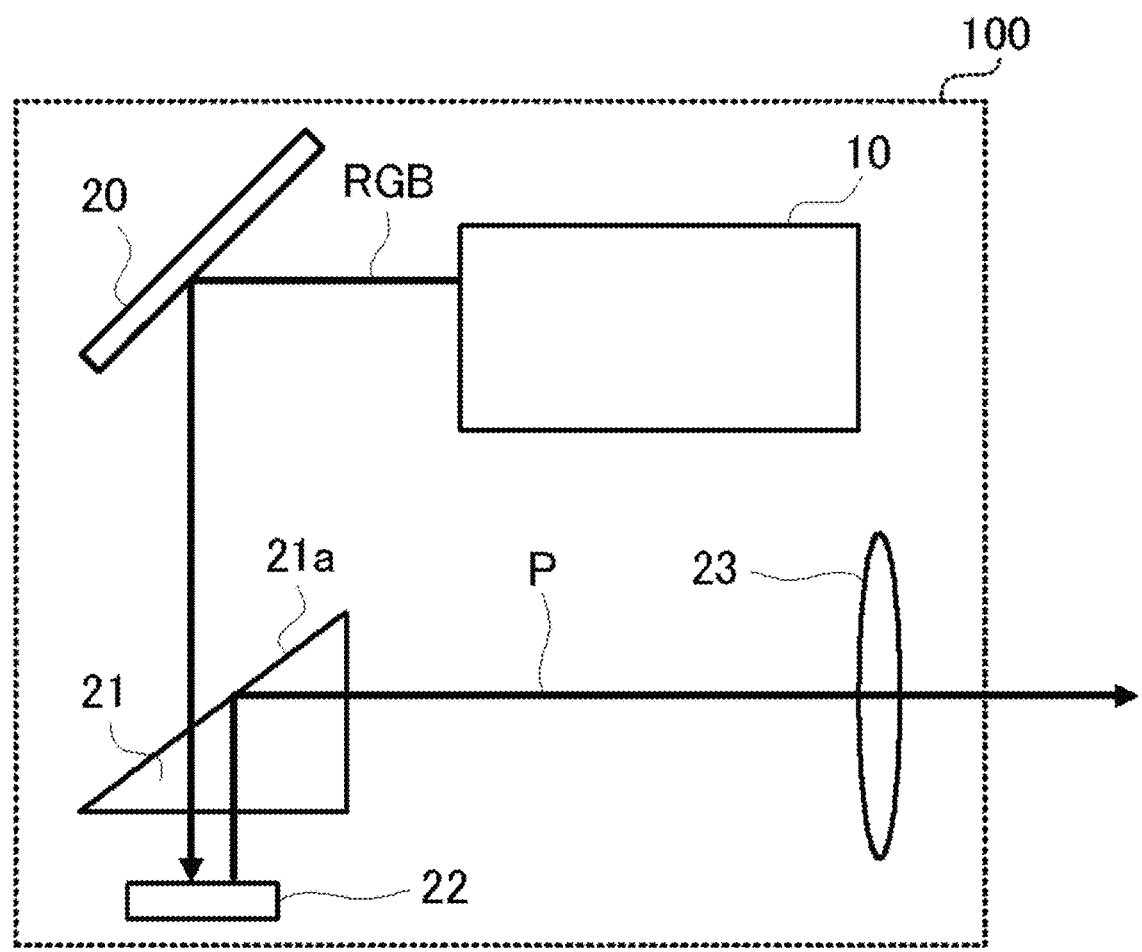
FIG. 3(a) is an overall configuration diagram of a projector and FIG. 3(b) is an overall configuration diagram of a lighting device.

As illustrated in FIG. 3(a), the projector 100 includes an illumination device 10, a mirror reflector 20, a prism 21, a display element 22, and a projection lens part 23.

Figure 3B:
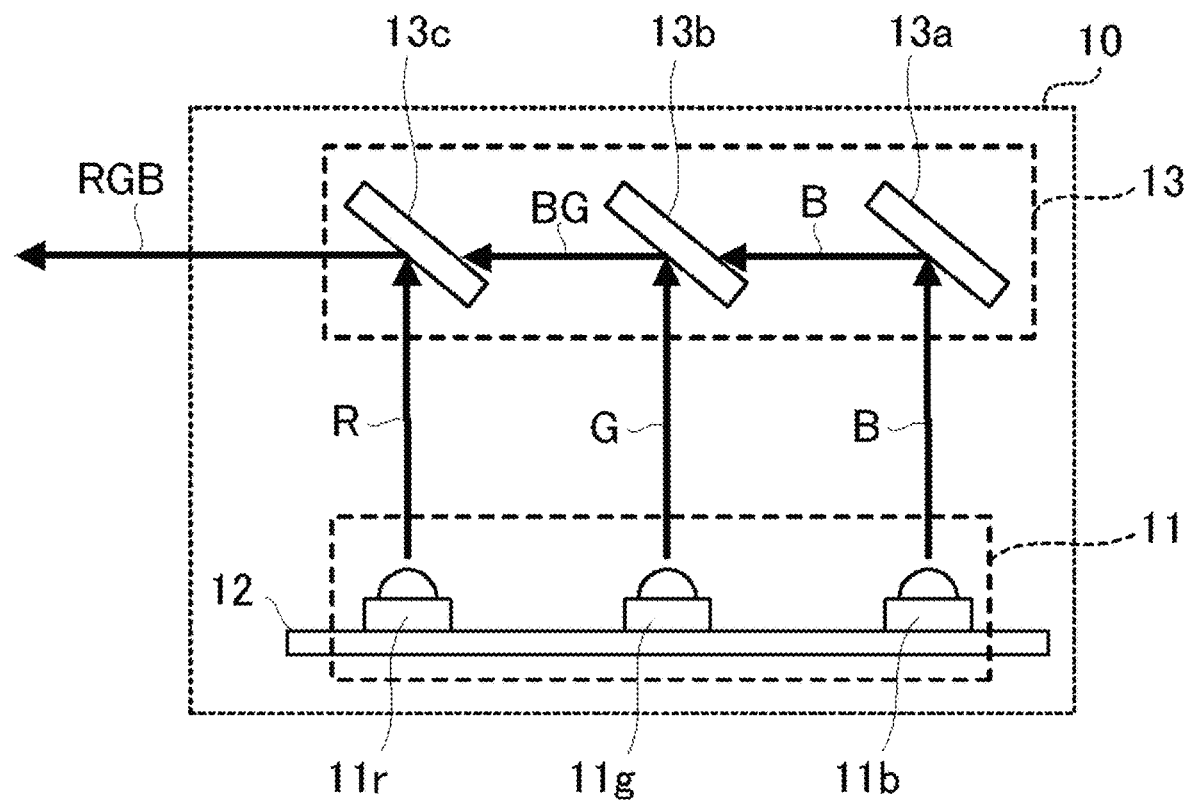

The illumination device 10 is for illuminating the display element 22 with the later-described illumination light RGB via the mirror reflector 20 and the prism 21, and, as illustrated in FIG. 3(b), the illumination device 10 includes a light source part 11, a circuit board 12, and a wave combining unit 13.

The light source part 11 includes a light source 11r that emits red light R, a light source 11g that emits green light G, and a light source 11b that emits blue light B. Each of the light sources 11r, 11g, and 11b is configured with, for example, a light emitting diode (LED). Each of the light sources 11r, 11g, and 11b is driven by the control unit 30 in a field sequential method so as to emit light at a predetermined light intensity and timing. The circuit board 12 is configured with, for example, a printed circuit board, on which the light sources 11r, 11g, and 11b are mounted.

The wave combining unit 13 is for combining the light R, G, and B that were emitted by the light sources 11r, 11g, and 11b and reached the wave combining unit 13, so as to emit the light R, G, and B as the illumination light RGB. Specifically, the wave combining unit 13 includes a reflection part 13a and wave combining parts 13b and 13c configured with dichroic mirrors. The reflection part 13a reflects the blue light B, which is emitted by the light source 11b, toward the wave combining part 13b. The wave combining part 13b reflects the green light G, which is emitted by the light source 11g, toward the wave combining part 13c and entirely transmits the blue light B traveling from the reflection part 13a. Accordingly, from the wave combining part 13b, the light BG in which the blue light B and the green light G are combined is emitted toward the wave combining part 13c. The wave combining part 13c reflects the red light R, which is emitted by the light source 11r, toward the mirror reflector 20 and entirely transmits the light BG traveling from the wave combining part 13b. In this way, from the wave combining part 13c, the illumination light RGB in which the light BG and the red light R are combined is emitted toward the mirror reflector 20.

The mirror reflector 20 is, for example, a plane mirror, which reflects the illumination light RGB emitted by the illumination device 10 toward the prism 21. The illumination light RGB traveling from the mirror reflector 20 is transmitted through the prism 21 so as to illuminate the display element 22. The display element 22 that is exposed to the illumination light RGB generates the projection light P as described later. The projection light P generated by the display element 22 is reflected toward the projection lens part 23 by the inclined surface 21a of the prism 21.

The display element 22 generates the projection light P, which includes the light indicating the image M, based on image data provided from the control unit 30. The display element 22 is configured with, for example, a DMD (Digital Micro-mirror Device) including multiple movable micromirrors, and each mirror is controlled to be in either an ON or OFF state by the control unit 30 so as to perform spatial light modulation on the illumination light RGB, in order to generate and emit the projection light P.

An electrode is disposed at a lower part of a micromirror of the display element 22, and each mirror is driven by this electrode in an extremely short cycle (for example, an order of μsec), so that each mirror becomes the ON or OFF state. Each mirror is movable around a fulcrum, which is a hinge, and, when the mirror is in the ON state, the mirror surface tilts in a forward direction at a predetermined angle (for example, +12°) around the fulcrum which is the hinge, and, when the mirror is in the OFF state, the mirror surface tilts in the opposite direction at a predetermined angle (for example, −12°) around the fulcrum which is the hinge. The mirror in the ON state reflects the illumination light RGB toward the prism 21. The illumination light RGB reflected by the mirror in the ON state is to be the light that reaches the screen 60. The mirror in the OFF state does not reflect the illumination light RGB toward the prism 21. The illumination light RGB that reached the mirror in the OFF state is to be the light that does not reach the screen 60. In this way, the projection light P is generated with the illumination light RGB that is selectively reflected by each mirror element, which is individually driven based on image data. The generated projection light P is projected onto the screen 60, so that the image M having a desired brightness and color is projected onto the screen 60.

The projection lens part 23 magnifies the projection light P, which was generated by the display element 22 and reached the projection lens part 23 through the prism 21, and emits the magnified projection light P toward the first reflection part 40. Note that it is both possible that the projection lens part 23 is configured with one lens and that the projection lens part 23 is configured with multiple lenses.

Returning to FIG. 2, the control unit 30 is configured with a microcomputer, a driver for driving the light source part 11, a driver for driving the display element 22, etc. The microcomputer includes a CPU (Central Processing Unit), a ROM (Read Only Memory), a RAM (Random Access Memory), etc. The CPU controls the overall operation of the HUD device 1 by reading and executing operation programs stored in advance in the ROM. The control unit 30 generates image data for displaying an image M indicating vehicle information, based on vehicle information obtained from an ECU (Electronic Control Unit) mounted on the vehicle 2. Then, the light source part 11 and the display element 22 are driven based on the image data (including drive signals for driving various drivers). Under the control by the control unit 30, the projector 100 emits projection light P including light indicating the image M.

Figure 4A:
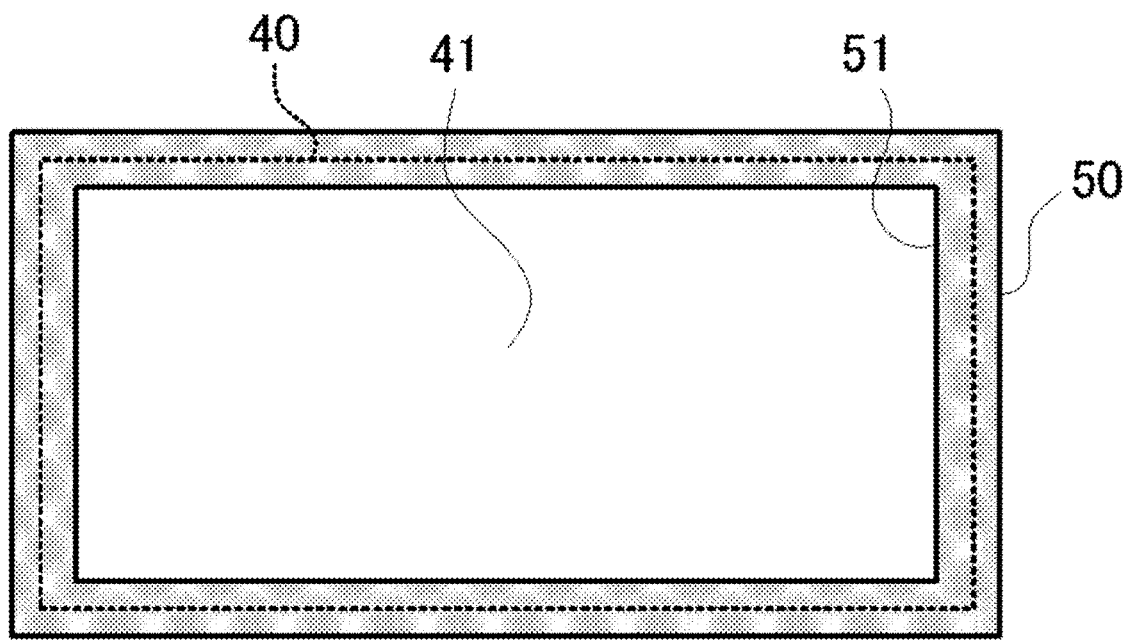
FIG. 4(a) is a plan view of a first reflection part and a frame body and FIG. 4(b) is a plan view for explaining various areas on a screen.

The first reflection part 40 is configured with, for example, a plane mirror, which includes a reflection surface 41 that reflects the projection light P, which is emitted by the projector 100, toward the screen 60. The reflection surface 41 is, for example, a rectangular surface when viewed in the normal direction thereof (in a plan view), as illustrated in FIG. 4(a). Of the projection light P, the reflection surface 41 at least reflects the light indicating the image M toward the screen 60. Note that it is also possible that the first reflection part 40 is a curved mirror (including a free-form mirror).

The frame body 50 is formed of, for example, resin so as to have light shielding properties and is disposed on the first reflection part 40. As illustrated in FIG. 4(a), the frame body 50 includes an opening 51 that defines the shape of the reflection surface 41 in a plan view. That is, the opening 51 of the frame body 50 is also formed in a rectangular shape in a plan view. The later-described light shielding part S is configured with a part of the frame body 50. Note that although the frame body 50 is schematically shown in FIG. 2 and FIG. 4(a), as long as the exposed area of the reflection surface 41 can be defined by the opening 51 and the positional conditions of the later-described light shielding part S are satisfied, the shape of the frame body 50 and the method for fixing the frame body 50 to the first reflection part 40 are arbitrary.

Figure 4B:
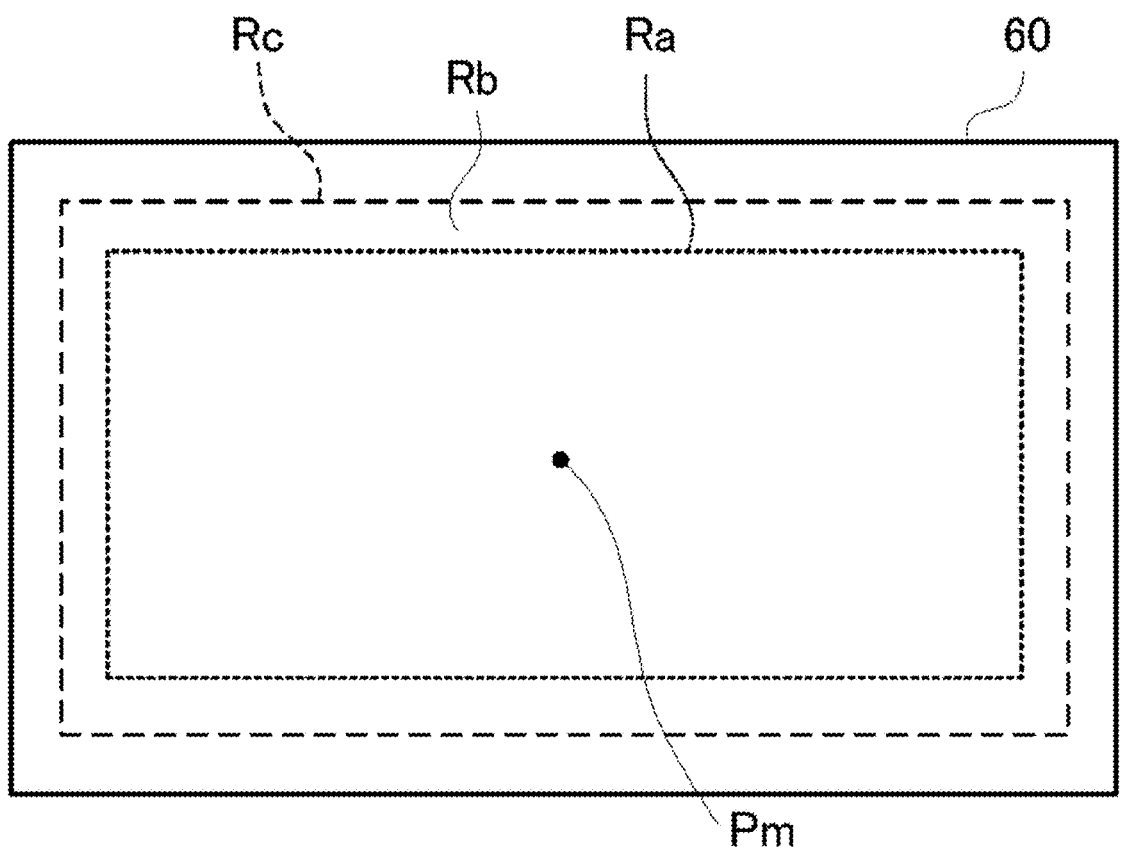

The screen 60 is exposed to the projection light P emitted from the projector 100 and reflected by the first reflection part 40. For example, the screen 60 is formed in a rectangular shape in a plan view, as illustrated in FIG. 4(b). The screen 60 is a transmissive screen configured with a holographic diffuser, a micro-lens array, a diffuser plate, etc., and the back surface thereof (the lower surface in FIG. 2) receives the projection light P from the first reflection part 40, so that the image M is displayed on the front surface thereof (the upper surface in FIG. 2). Accordingly, the display light L representing the image M is emitted toward the second reflection part 70.

The second reflection part 70 is configured with, for example, a plane mirror, which reflects the display light L traveling from the screen 60 toward the concave mirror 80.

The concave mirror 80 reflects the display light L traveling from the second reflection part 70 toward the windshield 3. Accordingly, the virtual image V to be imaged is magnified so as to be larger than the image M displayed on the screen 60.

The projector 100, the control unit 30, the first reflection part 40, the frame body 50, the screen 60, the second reflection part 70, and the concave mirror 80 are arranged at appropriate positions so as to achieve the above-described functions and accommodated in the housing 90. Note that, as a matter of course, it is also possible that the housing 90 is configured with a combination of multiple members. An opening is formed in the housing 90, and a light transmitting plate 91 is disposed on this opening. The light transmitting plate 91 is made of a light transmissive resin such as acrylic, so as to transmit the display light L traveling from the concave mirror 80.

A brief description is given of the mechanism by which the HUD device 1 displays the virtual image V. The projection light P emitted by the projector 100 is projected as the image M onto the screen 60 via the first reflection part 40. The display light L representing the image M, which is displayed on the screen 60, is emitted to the windshield 3 via the second reflection part 70, the concave mirror 80, and the light transmitting plate 91. In this way, the display light L emitted from the HUD device 1 is reflected by the windshield 3, so that the image M is displayed as the virtual image V in front of the windshield 3.

(About Various Areas on the Screen 60)

Next, explanations are given of various areas on the screen 60 with reference to FIG. 4(b). The screen 60 includes a display possible area Rc and a display area Ra on the surface facing the incident projection light P (the lower surface in FIG. 2). Note that, since the screen 60 is transmissive, the above can also be considered in such a way that the display possible area Rc, the display area Ra, and the later-described display margin area Rb are formed on the display light L emission surface (the upper surface of FIG. 2) of the screen 60.

The display possible area Rc is an area corresponding to the maximum range that the projection light P can reach, which is a range defined by the exit pupil 101 (see FIG. 5, etc.) of the projector 100. The exit pupil 101 corresponds to the image of the aperture stop that can be seen when looking into the projection lens part 23. Note that, since the aperture stop of the projector 100 is set for the projector 100 as appropriate, illustrations thereof is omitted. For example, the display possible area Rc is a rectangular area when viewed in the direction along the main ray Pm of the projection light P (in a plan view).

The display area Ra is an area inside the display possible area Rc and is an area on which the image M that is desired to be visually recognized by the observer 4 in practice is projected. That is, the display area Ra is the area where, of the projection light P, the light indicating the image M reaches. For example, the display area Ra is a rectangular area when viewed in the direction along the main ray Pm of the projection light P (in a plan view). Therefore, the image M displayed as the virtual image V is also visually recognized by the observer 4 in a rectangular state.

Figure 5:
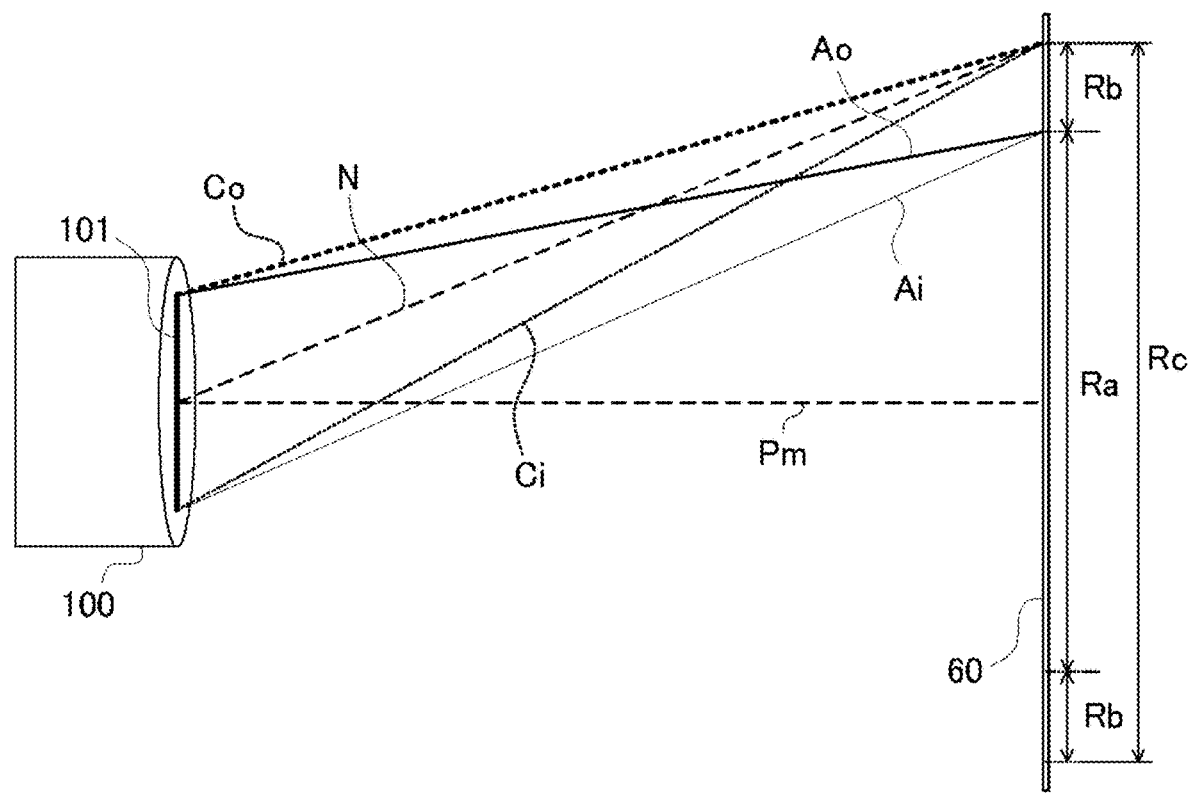
FIG. 5 is a schematic diagram for explaining lines along various rays.

The area between the display possible area Rc and the display area Ra is the display margin area Rb, as illustrated in FIG. 4(b), FIG. 5, etc. That is, the sum of the display area Ra and the display margin area Rb is the display possible area Rc.

The display margin area Rb is, for example, an area required for correcting distortion, etc., of the image M. For example, in a case where the image M that is desired to be visually recognized as a rectangular shape is distorted due to the optical design, the control unit 30 corrects the distortion by controlling the projection light P that reaches the display margin area Rb. Therefore, the projection light P that reached the display margin area Rb is slightly but visually recognized as the virtual image V. That is, strictly speaking, not only the image M, but also the image represented by the projection light P that reached the display margin area Rb is slightly but visually recognized as the virtual image V around the image M.

In a case of an HUD device having a projection system, due to the characteristics thereof, it is difficult to control the brightness of the projection light P in this display margin area Rb to be sufficiently lower than the brightness of the image M displayed in the display area Ra (to realize a high contrast), and, if no measures are taken, there has been a possibility of occurrence of the postcard, in which the outer edge of the image M displayed as the virtual image V is visually recognized in a slightly bright manner. In the HUD device 1 according to the present embodiment, the light shielding part S satisfies the later-described positional conditions, so that occurrence of the postcard is reduced.

(About the Positional Conditions of the Light Shielding Part S)

Next, an explanation is given of the positional conditions of the light shielding part S. First, for explaining the positional conditions, lines along various rays are defined with reference to FIG. 5. Note that the light shielding part S illustrated in FIG. 6(a) and FIG. 6(b) indicates a part of the frame body 50.

In FIG. 5, a part of the light paths from the exit pupil 101 of the projector 100 to the screen 60 when viewed in a direction perpendicular to the main ray Pm of the projection light P is schematically illustrated.

Note that, as illustrated in FIG. 2, although the projection light P reaches the screen 60 after being reflected by the first reflection part 40 in practice, the optical system of FIG. 5 is the same as that being in consideration of the reflection (the same applies to FIG. 6 through FIG. 8 below). Further, the positional conditions of the light shielding part S explained below are possible in a given direction among the directions perpendicular to the main ray Pm of the projection light P and are not limited to a particular direction such as an up-down direction, a left-right direction, or a diagonal direction of FIG. 4(b). Further, the positional conditions of the light shielding part S explained below can be considered in the same manner in each case of a ray traveling toward the upper area relative to the main ray Pm reaching the screen 60 and a ray traveling toward the lower area relative to the main ray Pm reaching the screen 60, and, therefore, an explanation of rays traveling toward the lower area relative to the main ray Pm reaching the screen 60 is omitted below. For this reason, in consideration of clarity of the drawings, the rays traveling toward the upper area relative to the main ray Pm reaching the screen 60 are illustrated in FIG. 5, etc.

In FIG. 5, the line along the ray traveling from the radial upper end (one end) of the exit pupil 101 toward the upper end (predetermined end) of the display possible area Rc is defined as the "first outside line Co". On the other hand, the line along the ray traveling from the radial lower end (another end) of the exit pupil 101 toward the upper end (predetermined end) of the display possible area Rc is defined as the "first inside line Ci" (the inside line in the Claims). In FIG. 5, the line along the ray traveling from the radial upper end (one end) of the exit pupil 101 toward the upper end (end of the display area Ra on the predetermined end side relative to the main ray Pm) of the display area Ra is defined as the "second outside line Ao". On the other hand, the line along the ray traveling from the radial lower end (other end) of the exit pupil 101 toward the upper end of the display area Ra is defined as the "second inside line Ai". In FIG. 5, the line along the ray traveling from the center of the exit pupil 101 toward the upper end (predetermined end) of the display possible area Rc is defined as the "middle line N".

Figure 8:
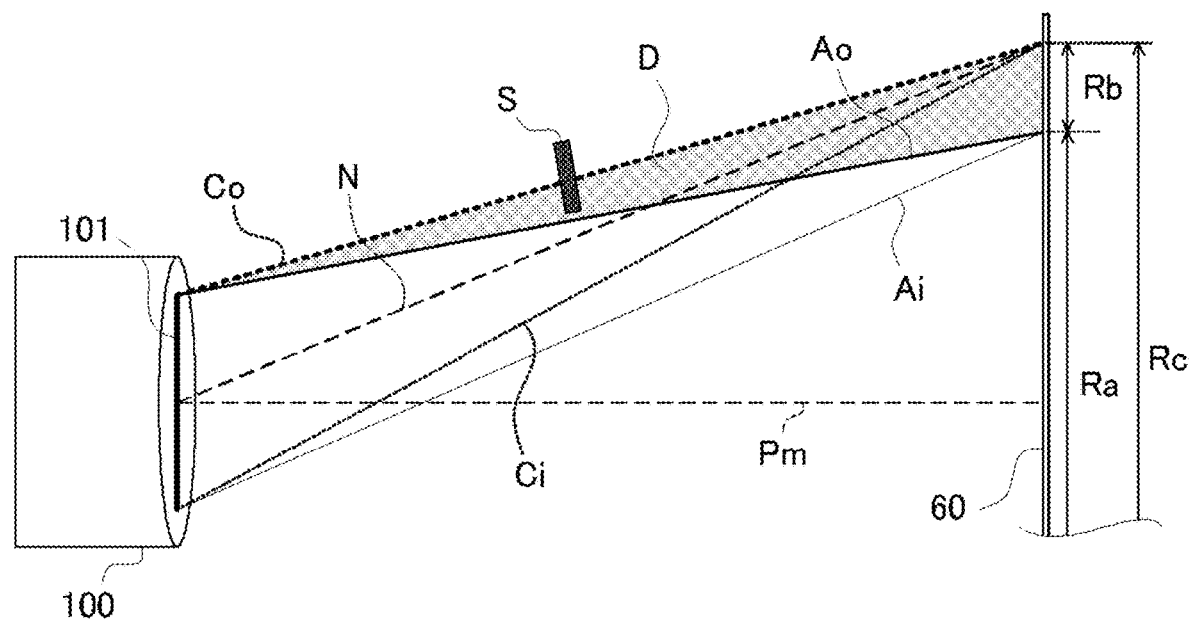
FIG. 8 is a schematic diagram for explaining a setting possible area.

The inventor of the present application found that it is possible to reduce the occurrence of the postcard by positioning the light shielding part S so that a part of the light shielding part S is included in a setting possible area D (the area between the first outside line Co and the second outside line Ao) illustrated in FIG. 8. Specifically, in order to reduce the occurrence of the postcard, it is necessary that the light shielding part S is at least positioned on the first outside line Co and outside the second outside line Ao, as illustrated in FIG. 8.

In the following, the example of the positional conditions (first through fourth positional conditions) to be satisfied by the light shielding part S is specifically explained by separating the setting possible area D into the first area D1, the second area D2 and the third area D3.

(First Positional Condition)

Figure 6A:
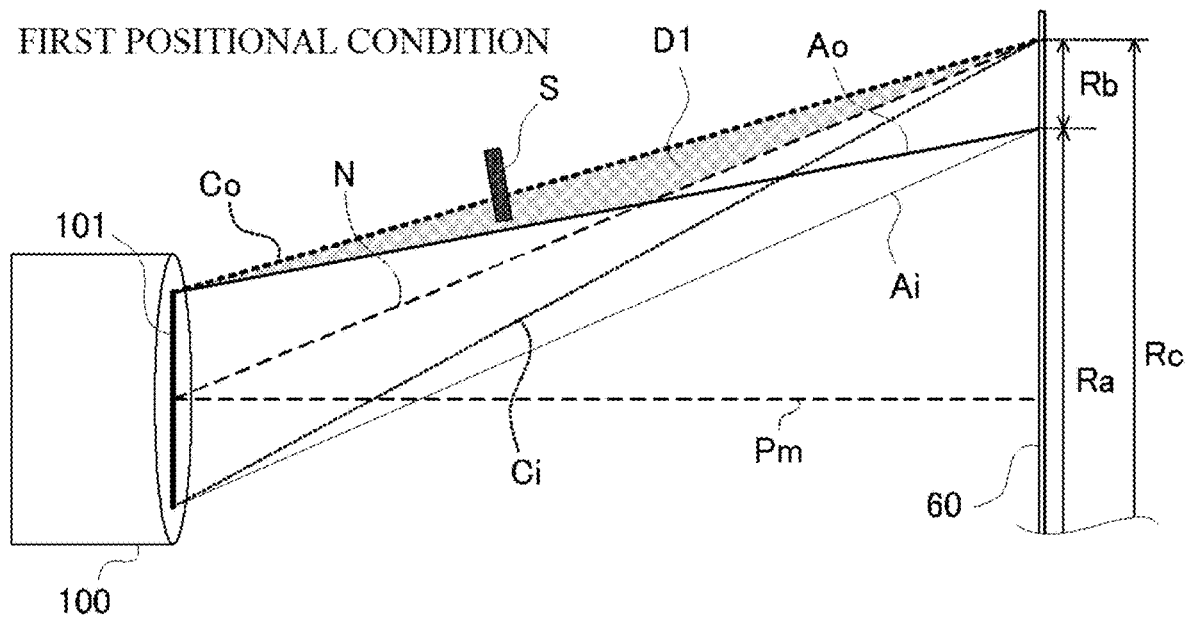
FIG. 6(a) is a schematic diagram for explaining the first positional condition and FIG. 6(b) is a schematic diagram for explaining the second positional condition.

The first positional condition is a condition that the light shielding part S is to be positioned so that a part of the light shielding part S is included in the first area D1 illustrated in FIG. 6(a). The first area D1 is an area surrounded by the second outside line Ao, the first outside line Co, and the middle line N. Specifically, the light shielding part S is disposed at a position that satisfies the condition of "being positioned on the first outside line Co as well as outside the second outside line Ao and outside the middle line N" (first positional condition).

Figure 9A:
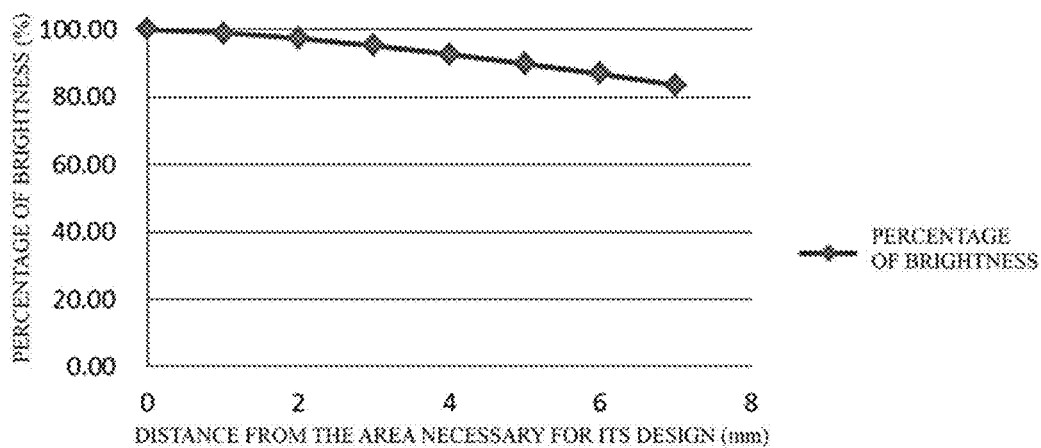
FIG. 9(a) is a diagram illustrating a luminance change rate of projection light in a display margin area in a case where a light shielding part satisfies the first positional condition and FIG. 9(b) is a diagram illustrating a luminance change rate of projection light in the display margin area in a case where the light shielding part satisfies the second positional condition.

FIG. 9(a) is a graph indicating the brightness change rate of the projection light P in the display margin area Rb in a case where the light shielding part S is disposed at a position that satisfies the first positional condition. The vertical axis of the graph indicates percentages (%) of the brightness of the projection light P in the display margin area Rb, with the brightness of the image M displayed (projected) in the display area Ra being 100%. The horizontal axis of the graph indicates distances (mm) from the outer edge of the display area Ra to the outer edge of the display possible area Rc, with the boundary between the display area Ra and the display margin area Rb being 0 mm. The same applies to FIG. 9(b), FIG. 10(a), and FIG. 10(b) described later. Note that FIG. 9(a), FIG. 9(b), FIG. 10(a), and FIG. 10(b) indicate graphs created based on test values obtained in a case where the diameter (width in the up-down direction in FIG. 5, etc.) of the exit pupil 101 is 14.22 mm, the width of the display margin area Rb is 7 mm, and the distance from the exit pupil 101 to the screen 60 is 322 mm.

As illustrated in FIG. 9(a), with the light shielding part S that satisfies the first positional condition, it is possible to gradually decrease the brightness of the projection light P from the start position (position on the display area Ra side) of the display margin area Rb and to make the brightness of the projection light P on the outer edge of the display margin area Rb be approximately 80% of that of the display area Ra, and, therefore, the occurrence of the postcard can be reduced.

(Second Positional Condition)

Figure 6B:
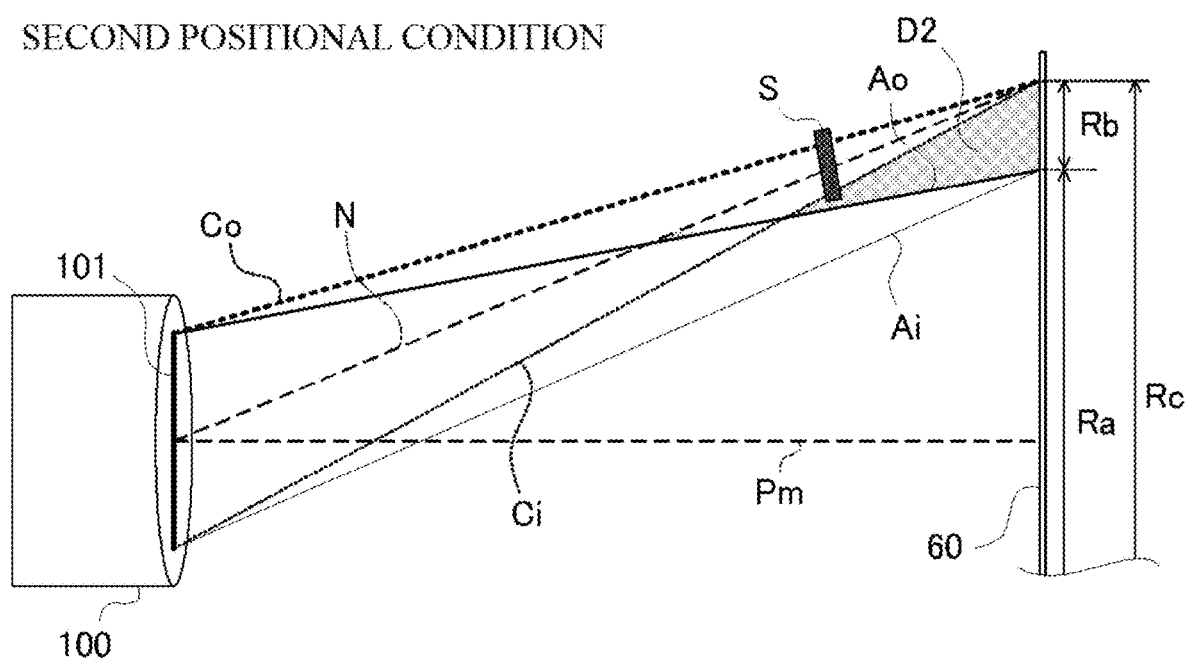

The second positional condition is a condition that the light shielding part S is to be positioned so that a part of the light shielding part S is included in the second area D2 illustrated in FIG. 6(b). The second area D2 is an area surrounded by the second outside line Ao and the first inside line Ci. Specifically, the light shielding part S is disposed at a position that satisfies the condition of "being positioned on the first outside line Co and on the first inside line Ci as well as outside the second outside line Ao" (second positional condition).

Figure 9B:
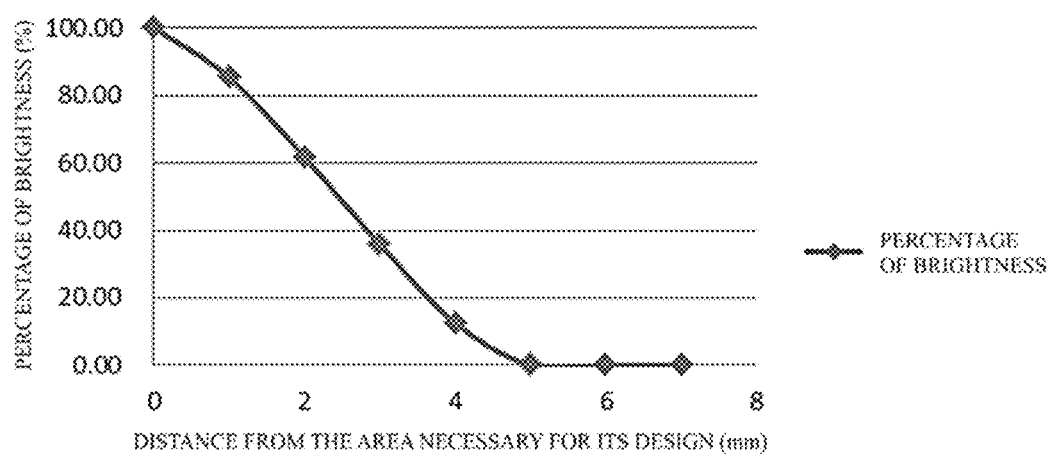
Figure 10A:
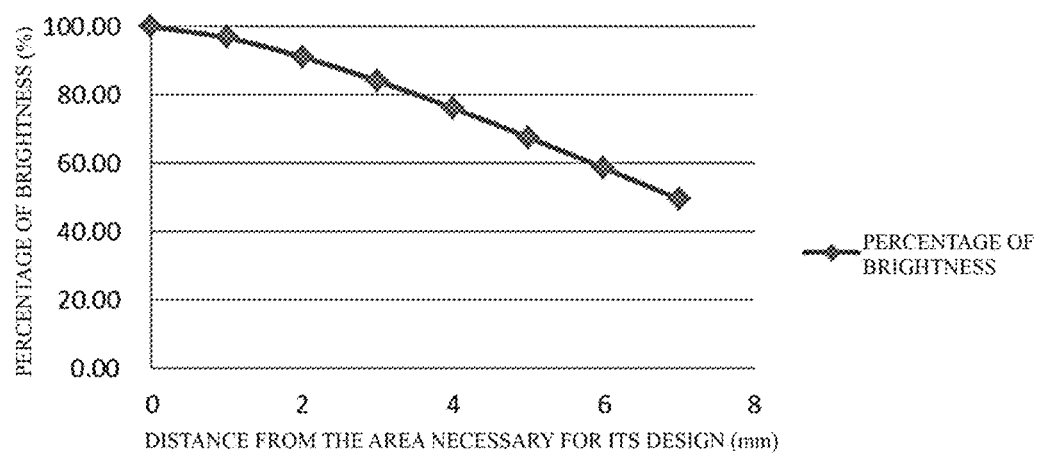
FIG. 10(a) is a diagram illustrating a luminance change rate of projection light in the display margin area in a case where the light shielding part satisfies the third positional condition and FIG. 10(b) is a diagram illustrating a luminance change rate of projection light in the display margin area in a case where the light shielding part satisfies the fourth positional condition.
Figure 10B:
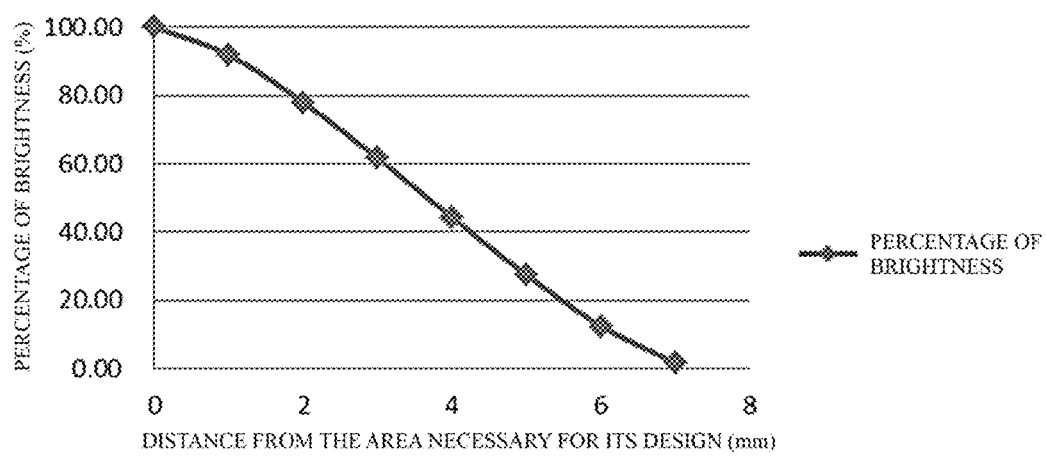

FIG. 9(b) is a graph indicating the brightness change rate of the projection light P in the display margin area Rb in a case where the light shielding part S is disposed at a position that satisfies the second positional condition. As illustrated in FIG. 9(a), with the light shielding part S that satisfies the second positional condition, it is possible to sharply decrease the brightness of the projection light P from the start position (position on the display area Ra side) of the display margin area Rb and to make the brightness of the projection light P on the outer edge part of the display margin area Rb be 0% of that of the display area Ra, and, therefore, the occurrence of the postcard can be preferably reduced.

(Third Positional Condition)

Figure 7A:
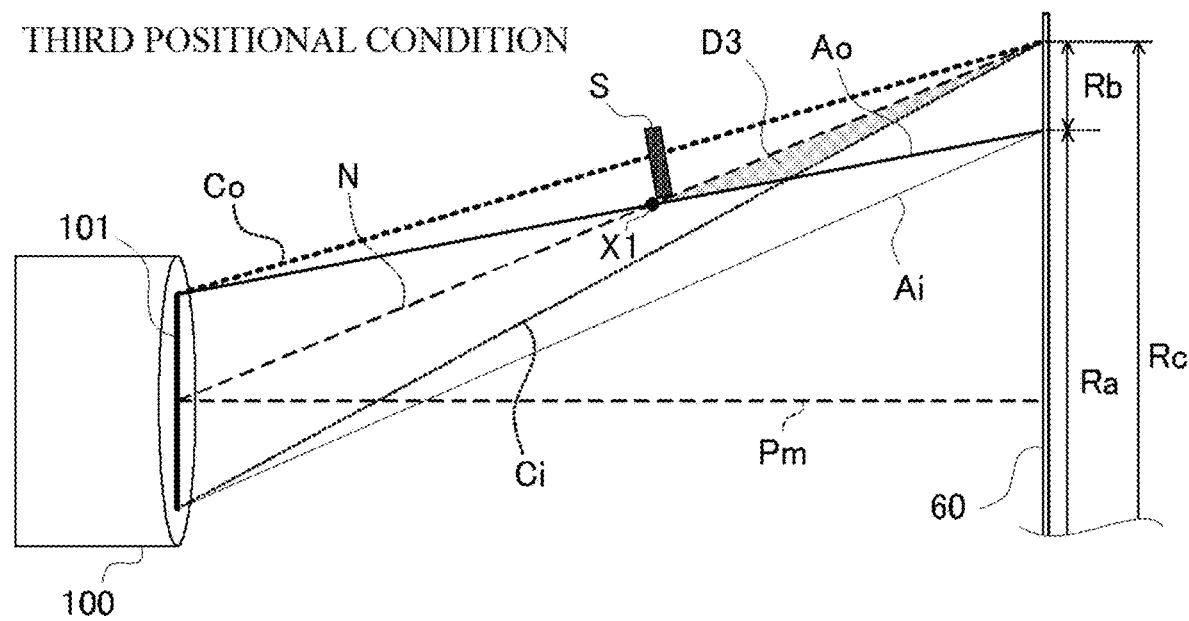
FIG. 7(a) is a schematic diagram for explaining the third positional condition and FIG. 7(b) is a schematic diagram for explaining the fourth positional condition.

The third positional condition is a condition that the light shielding part S is to be positioned so that a part of the light shielding part S is included in the third area D3 illustrated in FIG. 7(a). The third area D3 is an area surrounded by the second outside line Ao, the first inside line Ci, and the middle line N. Specifically, the light shielding part S is disposed at a position that satisfies the condition of "being positioned on the first outside line Co and on the middle line N as well as outside the second outside line Ao and outside the first inside line Ci" (third positional condition).

FIG. 10(*a*) is a graph indicating the brightness change rate of the projection light P in the display margin area Rb in a case where the light shielding part S is disposed at a position that satisfies the third positional condition and the lower end (end on the main ray Pm side) of the light shielding part S reaches the first intersection X1. The first intersection X1 is the intersection of the second outside line Ao and the middle line N, as illustrated in FIG. 7(*a*). As illustrated in FIG. 10(*a*), with the light shielding part S that satisfies the third positional condition, it is possible to gradually decrease the brightness of the projection light P from the start position (position on the display area Ra side) of the display margin area Rb and to make the brightness of the projection light P on the outer edge part of the display margin area Rb be equal to or lower than 50% of that of the display area Ra. Therefore, it is possible to achieve the merits of both of the first positional condition and the second positional condition to some extent, so as to preferably reduce the occurrence of the postcard. Note that, although the contrast ratio of an HUD device using a TFT is generally "2000:1" and the contrast ratio of a projection-system HUD device using a DMD is generally "1000:1", in a case where the brightness of the projection light P on the outer edge part of the display margin area Rb is made to be equal to or lower than 50% of that of the display area Ra in the above-described way, it is possible to realize black pixels equivalent to an HUD device using a TFT (that is, a display with the outer edge part not being visually recognized in a slightly bright manner).

(Fourth Positional Condition)

Figure 7B:
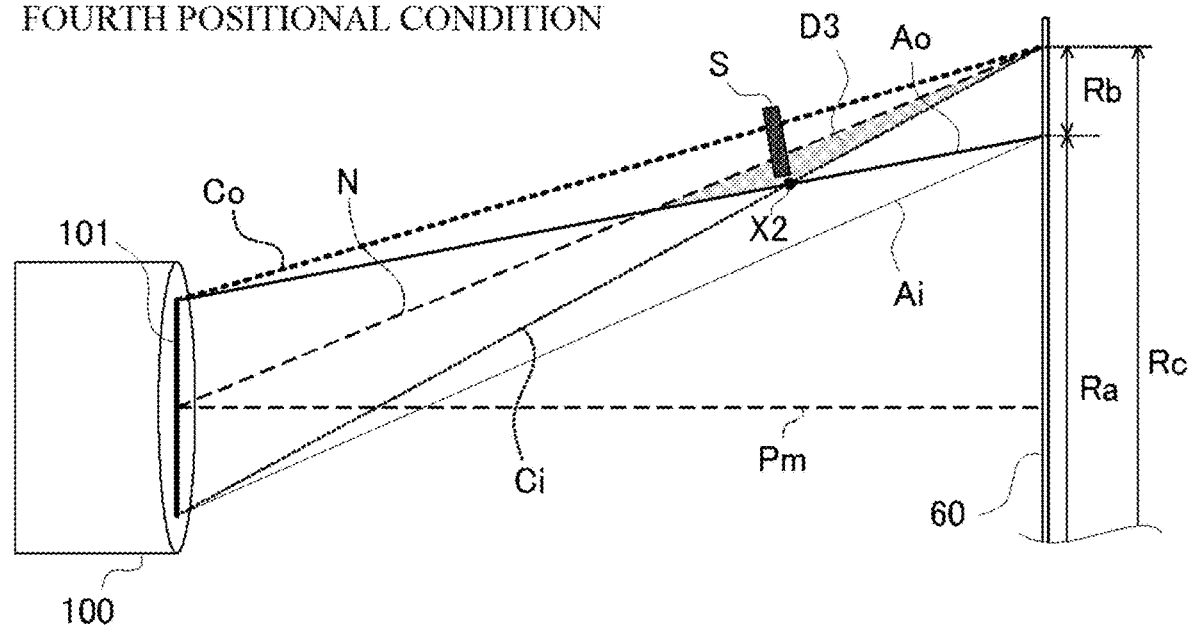

The fourth positional condition is a condition that limits the third positional condition and is a condition that the light shielding part S is to be positioned so that the lower end (end on the main ray Pm side) of the light shielding part S reaches the vicinity of the second intersection X2 as illustrated in FIG. 7(*b*). The second intersection X2 is the intersection of the second outside line Ao and the first inside line Ci. Note that "the light shielding part S is positioned in the vicinity of the second intersection X2" indicates a situation where the lower end of the light shielding part S is positioned as close to the second intersection X2 as possible in such a range that the light shielding part S does not block the second outside line Ao, which is to be the outer edge of the image M, and includes a state with a shift of several millimeters from the former-described situation due to a request related to its design.

FIG. 10(*b*) is a graph indicating the brightness change rate of the projection light P in the display margin area Rb in a case where the light shielding part S is disposed at a position that satisfies the fourth positional condition. As illustrated in FIG. 10(*b*), with the light shielding part S that satisfies the fourth positional condition, it is possible to gradually decrease the brightness of the projection light P from the start position (position on the display area Ra side) of the display margin area Rb and to make the brightness of the projection light P on the outer edge of the display margin area Rb be 0% of that of the display area Ra. Therefore, it is possible to achieve the merits of both of the first positional condition and the second positional condition and to provide an HUD device 1 in which the occurrence of the postcard is extremely unrecognizable.

The sum of the first area D1, the second area D2, and the third area D3 explained above is the setting possible area D. That is, it is possible to reduce the occurrence of the postcard by positioning the light shielding part S so that a part of the light shielding part S is included in the setting possible area D illustrated in FIG. 8.

As described above, it is necessary that the light shielding part S is at least positioned on the first outside line Co and outside the second outside line Ao. Here, when the light shielding part S is "positioned on the first outside line Co", it means that the light shielding part S includes a section that blocks the ray along the first outside line Co. Further, when the light shielding part S is "positioned outside the second outside line Ao", it means that the end of the light shielding part S on the main ray Pm side is positioned in a direction farther from the main ray Pm relative to the second outside line Ao and does not block the ray along the second outside line Ao. Regarding other lines, the same applies to the meanings of such descriptions "the light shielding part S is positioned on a predetermined line" and "the light shielding part S is positioned outside a predetermined line".

Note that as long as the light shielding part S satisfies any of the first through fourth positional conditions, the position and shape of the light shielding part S are arbitrary and can be decided in consideration of the following characteristics 1 and 2 according to the purpose.

(Characteristic 1) The closer the end of the light shielding part S on the main ray Pm side is to the second outside line Ao, the faster the brightness of the projection light P from the start position of the display margin area Rb toward the outer edge begins to decrease. Contrarily, the farther the end of the light shielding part S on the main ray Pm side is from the second outside line Ao, the slower the brightness of the projection light P from the start position of the display margin area Rb toward the outer edge begins to decrease.

(Characteristic 2) The closer the light shielding part S is to the screen 60, the steeper the decrease rate of the brightness of the projection light P from the start position of the display margin area Rb toward the outer edge becomes. Contrarily, the farther the light shielding part S is from the screen 60, the gentler the decrease rate of the brightness of the projection light P from the start position of the display margin area Rb toward the outer edge becomes.

Furthermore, the light shielding part S only needs to have a shape that corresponds to at least one of the four sides of a rectangle in a plan view. For example, it is not necessary but is preferable that the light shielding part S that corresponds to each of the four sides of a rectangle in such a manner as the frame-shaped portion surrounding the opening 51 of the frame body 50 as illustrated in FIG. 4(*a*) satisfies any of the first through fourth positional conditions. It is also possible that the light shielding part S has a shape that corresponds to only given one of the four sides of a rectangle and satisfies any of the first through fourth positional conditions. Further, it is also possible that the light shielding part S has a shape that corresponds to given two or three of the four sides of a rectangle and that the light shielding parts S corresponding to the respective sides satisfy any of the first through fourth positional conditions. Note that, in a case where the light shielding part S is disposed so as to correspond to given two or more of the four sides of a rectangle, it is preferable that light shielding parts S are respectively disposed on the left and right sides of the reflection surface 41 in a plan view, so that the light shielding parts S correspond to the left and right for the observer 4 who visually recognizes the virtual image V. This is because it is assumed to be bothersome for the observer 4, who visually recognizes the virtual image V, to see a boundary that is unnecessary for displaying the image M especially in a case where the observer 4 changes the direction of eyes to the left or right.

Note that the present invention is not limited to the above-described embodiment and drawings. It is possible to add modifications (including deletion of constituent elements) to the embodiment and the drawings as appropriate in such a range that the gist of the present invention is not changed.

Although, in the above, an explanation is given of the example in which the light shielding part S is configured as at least a part of the frame body 50 disposed on the first reflection part 40 (an example of a reflection part), the present invention is not limited as such. The light shielding part S can be configured with a given member as long as any of the first through fourth positional conditions is satisfied and the light shielding part S is positioned between the projector 100 and the screen 60, and, for example, it is also possible that the light shielding part S is realized as a member dedicated to blocking light. In addition, a configuration in which an optical member (a lens, a mirror, etc.) other than the first reflection part 40 is further disposed between the projector 100 and the screen 60 is also possible. Furthermore, it is also possible that a member configuring the light shielding part S is disposed on the optical member. In addition, a configuration in which the projection light P traveling from the projector 100 is projected onto the screen 60 without traveling through the first reflection part 40 is also possible.

Further, as long as the relationship of the various rays between the exit pupil 101 and the various areas on the screen 60 is optically the same as the above-described explanation, any configuration is included in the scope of the present invention even though other optical modulations such as refraction and reflection are performed between the exit pupil 101 and the screen 60. Further, as a matter of course, a configuration in which the screen 60 is tilted diagonally relative to the main ray Pm is also possible.

Further, as long as the HUD device 1 has a projection system in which the projection light P is projected onto the screen 60, the HUD device 1 is not limited to one using a DMD and, for example, may be one using a LCOS (Liquid Crystal On Silicon), etc., as a reflective display element.

Although, in the above, an explanation is given of the example in which the display light L is emitted toward the windshield 3 (front glass) of the vehicle 2, the present invention is not limited as such. A configuration in which the HUD device 1 emits the display light L toward a dedicated combiner other than the windshield 3 is also possible.

Although the example of a transportation device on which the HUD device 1 is mounted is the vehicle 2 in the above explanation, the present invention is not limited as such. It is also possible that the HUD device 1 is mounted on other transportation devices (ships, aircrafts, etc.). Furthermore, the HUD device 1 is not limited to those mounted on transportation devices.

In the above explanation, for ease of the understanding of the present invention, explanations of non-important publicly-known technical matters are omitted as appropriate.

DESCRIPTION OF REFERENCE NUMERALS

1 head up display (HUD) device
2 vehicle
3 windshield
4 observer
L display light
virtual image
100 projector
10 lighting device
RGB illumination light
22 display element
P projection light
23 projection lens part
30 control unit
40 first reflection part (an example of a reflection part)
41 reflection surface
50 frame body
51 opening
S light shielding part
60 screen,
M image
Ra display area
Rb display margin area
Rc display possible area
101 exit pupil
Co first outside line
Ci first inside line (an example of an inside line)
Ao second outside line
Ai second inside line
N middle line
Pm main ray
D setting possible area
D1 first area
D2 second area
D3 third area,
X1 first intersection
X2 second intersection (an example of an intersection)

The invention claimed is:

1. A head up display device that emits display light representing an image toward a light transmitting member in order to cause the image to be visually recognized as a virtual image, the head up display device comprising:
    a projector including an exit pupil, wherein the projector is configured to emit projection light via the exit pupil, and wherein the projection light includes first light indicating the image to be visually recognized as the virtual image and second light not indicating the image;
    a screen configured to i) receive the projection light such that the image is projected onto the screen and ii) emit the display light representing the image, wherein the screen includes:
        a display possible area having an outer edge that corresponds to an outer edge of the projection light
        a display area onto which the first light indicating the image is projected, the display area being disposed inside the display possible area and having an outer edge that corresponds to an outer edge of the first light indicating the image; and
        a display margin area onto which the second light not indicating image is projected, the display margin area extending from the outer edge of the display area to the outer edge of the display possible area; and
    a light shielding part positioned on a light path of the projection light between the projector and the screen to i) block a first ray of the projection light traveling from a first point on a radial end of the exit pupil to a first point on the outer edge of the display possible area and ii) allow a second ray of the projection light traveling from the first point on the radial end of the exit pupil to a first point on the outer edge of the display area to pass such that a first part of the second light projected toward the display margin area is blocked while a second part of the second light projected toward the display margin area is allowed to pass.

2. The head up display device according to claim 1, wherein the light shielding part is positioned such that a third ray of the projection light traveling from a center of the exit pupil to the first point on the outer edge of the display possible area is allowed to pass.

3. The head up display device according to claim 1, wherein the light shielding part is positioned such that a fourth ray of the projection light traveling from a second point on the radial end of the exit pupil to the first point on the outer edge of the display possible area is blocked, and
   wherein the second point on the radial end of the exit pupil is located diametrically opposite the first point on the radial end of the exit pupil.

4. The head up display device according to claim 1, wherein the light shielding part is positioned such that a third ray of the projection light traveling from a center of the exit pupil to the first point on the outer edge of the display possible area is blocked while a fourth ray of the projection light traveling from a second point on the radial end of the exit pupil to the first point on the outer edge of the display possible area is allowed to pass, and
   wherein the second point on the radial end of the exit pupil is located diametrically opposite the first point on the radial end of the exit pupil.

5. The head up display device according to claim 4, wherein the light shielding part is positioned in a vicinity of an intersection of the second ray and the fourth ray.

6. The head up display device according to claim 1, further comprising:
   a reflection part including a reflection surface that reflects the projection light emitted by the projector toward the screen; and
   a frame body disposed on the reflection part, the frame body including an opening through which the reflection surface is seen,
   wherein the light shielding part is configured with at least a part of the frame body.

7. The head up display device according to claim 1,
   wherein the display possible area is in a rectangular shape in a plan view, and
   wherein the light shielding part is in a shape that corresponds to at least one of four sides of the rectangular shape of the display possible area in the plan view.

8. The head up display device according to claim 1, the head up display device being mounted on a vehicle and configured to emit the display light toward a front glass, which is the light transmitting member, of the vehicle.

* * * * *